United States Patent
Sato

(10) Patent No.: US 8,428,382 B2
(45) Date of Patent: Apr. 23, 2013

(54) HAIR IMAGE DISPLAY METHOD AND DISPLAY APPARATUS

(75) Inventor: Hirayuki Sato, Haga-gun (JP)

(73) Assignee: Kao Corporation, Tokyo (JP)

( * ) Notice: Subject to any disclaimer, the term of this patent is extended or adjusted under 35 U.S.C. 154(b) by 851 days.

(21) Appl. No.: 12/527,198

(22) PCT Filed: Feb. 15, 2008

(86) PCT No.: PCT/JP2008/052581
§ 371 (c)(1),
(2), (4) Date: Aug. 14, 2009

(87) PCT Pub. No.: WO2008/099938
PCT Pub. Date: Aug. 21, 2008

(65) Prior Publication Data
US 2010/0026717 A1    Feb. 4, 2010

(30) Foreign Application Priority Data

Feb. 16, 2007  (JP) .................................. 2007-035694
Feb. 16, 2007  (JP) .................................. 2007-035696
Feb. 16, 2007  (JP) .................................. 2007-035697

(51) Int. Cl.
*G06K 9/40*  (2006.01)
(52) U.S. Cl.
USPC ............................ 382/254; 382/263; 382/267
(58) Field of Classification Search ........... 382/115–118
See application file for complete search history.

(56) References Cited

U.S. PATENT DOCUMENTS

| | | | |
|---|---|---|---|
| 6,075,590 A * | 6/2000 | Edgar | 356/237.1 |
| 7,212,672 B2 * | 5/2007 | Fujieda et | 382/199 |
| 2002/0065456 A1 * | 5/2002 | Bazin et al. | 600/407 |
| 2004/0022439 A1 * | 2/2004 | Beardsley | 382/224 |
| 2004/0170337 A1 * | 9/2004 | Simon et al. | 382/254 |

FOREIGN PATENT DOCUMENTS

| | | |
|---|---|---|
| JP | 4 105045 | 4/1992 |
| JP | 11 92346 | 4/1999 |
| JP | 2000 287953 | 10/2000 |
| JP | 2001 209796 | 8/2001 |

* cited by examiner

*Primary Examiner* — Alex Liew
(74) *Attorney, Agent, or Firm* — Oblon, Spivak, McClelland, Maier & Neustadt, L.L.P.

(57) ABSTRACT

A hair image display method comprises the steps of: selecting a hair area from a hair image; performing an edge detection on the hair area to calculate an edge image; performing representation processing on the edge image to calculate a representative value image; calculating direction differences between the edge image and the representative value image; and rendering the direction differences of respective pixels in color or grayscale to display a direction difference image, or rendering the correlation lengths of respective pixels in an edge direction image in color or grayscale to display a bundle width image, or determining the curvatures of the respective pixels in the edge direction image to form a curvature image. This makes it possible to display directions straying from a flow, bundles of hairs in the same flow, and the state of curls in hair styling clearly, and to facilitate evaluations of the hair styling.

6 Claims, 24 Drawing Sheets

Original image

Edge image (horizontal)

Edge image (vertical)

Edge direction image

Edge strength image

With radius of two adjacent pixels
Representative value image (horizontal)

With radius of two adjacent pixels
Representative value image (vertical)

With radius of five adjacent pixels
Representative value image (horizontal)

With radius of five adjacent pixels
Representative value image (vertical)

Direction difference image between edge images
and representative value images

Mahalanobis' generalized distance

Noise-eliminated direction difference image
between edge images and representative value images Mahalanobis' generalized distance Original image Edge image (horizontal)

Edge image (vertical)

Edge direction image

Edge strength image

Bundle width image

Original image

Edge image (horizontal)

Edge image (vertical)

Edge direction image

Edge strength image

Curvature image

Original image

Direction difference image

Original image

Bundle width image

Original image

Bundle width image

Original image

Curvature image

HAIR IMAGE DISPLAY METHOD AND DISPLAY APPARATUS

TECHNICAL FIELD

The present invention relates to a hair image display method and display apparatus for displaying the state of styling of hair clearly.

BACKGROUND ART

For hair styling, it matters whether or not the hair spreads, flows, or curls as intended, whether or not there are any hairs straying from the flow (i.e., so-called frizzy hairs), whether or not the initial styling lasts stably regardless of humidity, etc. A variety of styling aids, relaxors, perm solutions, and the like have thus been developed.

There have been developed instruments for measuring such physical properties as the thickness, tensile strength, and moisture content of each strand of hair, as well as an observation instrument for performing an image analysis on cuticle, cortex, medullar, and so on (Patent Document 1). There has been no apparatus, however, that displays the state of overall styling of hair clearly for objective evaluations. For that reason, styling aids and the like have been evaluated almost exclusively through actual use and sensory evaluations for disorder of hairstyles (Patent Document 2).

[Patent Document 1] JP-A-2000-287953
[Patent Document 2] JP-A-H11-92346

DISCLOSURE OF THE INVENTION

Problems to be Solved by the Invention

In view of the conventional technologies described above, it is an object of the present invention to perform image processing on a hair image to display the state of overall styling of hair clearly so as to allow evaluations of the state. More specifically, the objects of the present invention comprises, in hair styling: (i) to display hairs straying from a flow clearly so that the styling can be evaluated easily; (ii) to display the same flows of hairs as hair bundles clearly so that a change in the bundle width can be evaluated easily; and (iii) to display the state of curls of hair clearly so that a change in the curvature can be evaluated easily.

Means for Solving the Problems

The inventor has achieved the present invention on the following findings: (i) by applying certain image processing to an image of styling of hair and displaying hairs straying from a flow of hair in different colors from hairs along the flow depending on the degree of straying, it is possible to recognize the degree of frizziness of hairs easily and evaluate whether the styling is successful or not easily; (ii) by applying certain image processing to an image of styling of hair and applying colors or tones according to bundle widths to an edge direction image of the hair, it is possible to evaluate the degree of spreading of the hair styling easily; and (iii) by applying certain image processing to an image of styling of hair to calculate the curvatures of respective pixels in an hair area and applying colors or tones to the pixels according to their respective curvatures, it is possible to visually check and evaluate the state of curls of hair easily.

More specifically, for a first hair image display method, the present invention provides a hair image display method including: selecting a hair area from a hair image; performing an edge detection on the hair area to calculate an edge image; performing representation processing on the edge image to calculate a representative value image; calculating direction differences between the edge image and the representative value image; and rendering the direction differences of respective pixels in color or grayscale to display a direction difference image.

For a first apparatus for implementing the foregoing hair image display method, the present invention provides a hair image display apparatus including: hair image acquisition means; means for selecting a hair area from a hair image; means for performing an edge detection on the hair area to calculate an edge image; means for performing representation processing on the edge image to calculate a representative value image; means for calculating direction differences between the edge image and the representative value image; means for rendering the direction differences of respective pixels in color or grayscale to calculate a direction difference image; and display means for displaying the direction difference image.

For a second hair image display method, the present invention provides a hair image display method including: selecting a hair area from a hair image; performing an edge detection on the hair area to calculate an edge direction image; calculating a correlation length of a pixel in the hair area as to edge directions of adjacent pixels with respect to a direction orthogonal to an edge direction of the pixel; and rendering the correlation lengths of respective pixels in color or grayscale to display a bundle width image of hair.

For a second apparatus for implementing the foregoing hair image display method, the present invention provides a hair image display apparatus including: hair image acquisition means; means for selecting a hair area from a hair image; means for performing an edge detection on the hair area to calculate an edge direction image; means for calculating a correlation length of a pixel in the hair area as to edge directions of adjacent pixels with respect to a direction orthogonal to an edge direction of the pixel; means for rendering the correlation lengths of respective pixels in color or grayscale to calculate a bundle width image of hair; and display means for displaying the bundle width image of hair.

For a third hair image display method, the present invention provides a hair image forming method including: selecting a hair area from a hair image; performing an edge detection on the hair area to calculate an edge direction image; tracing edge directions in succession from an adjacent pixel of a target pixel to obtain a flowing curve; fitting the adjacent pixel into a circle by using a weight function that gives the adjacent pixel a higher weight as a distance between the flowing curve and the target pixel is smaller; employing a curvature of the circle as a curvature of the target pixel; and calculating the thus obtained curvature on each pixel in the hair area to form a curvature image of hair.

For a third apparatus for implementing the foregoing hair image forming method, the present invention provides a hair image display apparatus including: hair image acquisition means; arithmetic means having the functions of selecting a hair area from a hair image, performing an edge detection on the hair area to calculate an edge direction image, tracing edge directions in succession from an adjacent pixel of a target pixel to obtain a flowing curve, fitting the adjacent pixel into a circle by using a weight function that gives the adjacent pixel a higher weight as a distance between the flowing curve and the target pixel is smaller, employing a curvature of the circle as a curvature of the target pixel, and calculating such a curvature on each pixel in the hair area to form a curvature image; and display means for displaying the curvature image of hair.

Effect of the Invention

According to the first hair image display method of the present invention, the direction difference image displays hairs straying from a flow of hair styling in different colors or tones from hairs along the flow depending on the degree of straying. It is therefore possible to recognize the tidiness of overall styling easily and to add up the degree of straying, distribution and the like of hairs straying from a flow easily. This allows evaluation on hair styling, which is also useful in evaluating hair cosmetics themselves that are used for the styling and in evaluating styling methods.

According to the first hair image display apparatus of the present invention, the first hair image display method of the present invention can be implemented easily.

According to the second hair image display method of the present invention, the bundle width image of hair displays the pixels in the hair area in colors or tones according to the respective correlation lengths corresponding to the widths of hair bundles. This makes it possible to recognize the hair bundles in the overall styling easily, and to add up the distribution, temporal changes, and the like of the bundle widths easily. As a result, it becomes possible to evaluate the spreading of hair bundles in the styling. In addition, when hair treatment cosmetics are used for styling or when additional moisture or the like is given to the hair subsequently, the correlation lengths of the edge directions of hairs can be obtained over time to evaluate the hair cosmetics themselves and the styling methods themselves that are used for styling.

According to the second hair image display apparatus of the present invention, the second hair image display method of the present invention can be implemented easily.

According to the third hair image forming method of the present invention, the curvature image of hair can display the pixels in the hair area in colors or tones according to the curvatures of the respective pixels. This makes it possible to recognize the curls of hair in the overall styling easily, and to add up the distribution, temporal changes, etc. of curl sizes in the overall styling easily. In addition, when hair treatment cosmetics are used for styling or when additional moisture or the like is given to the hair subsequently, the curvature images of hair can be obtained over time to evaluate the hair cosmetics themselves and the styling methods themselves that are used for the styling.

According to the third hair image display apparatus of the present invention, the third hair image display method of the present invention can be implemented easily.

Figure 1:
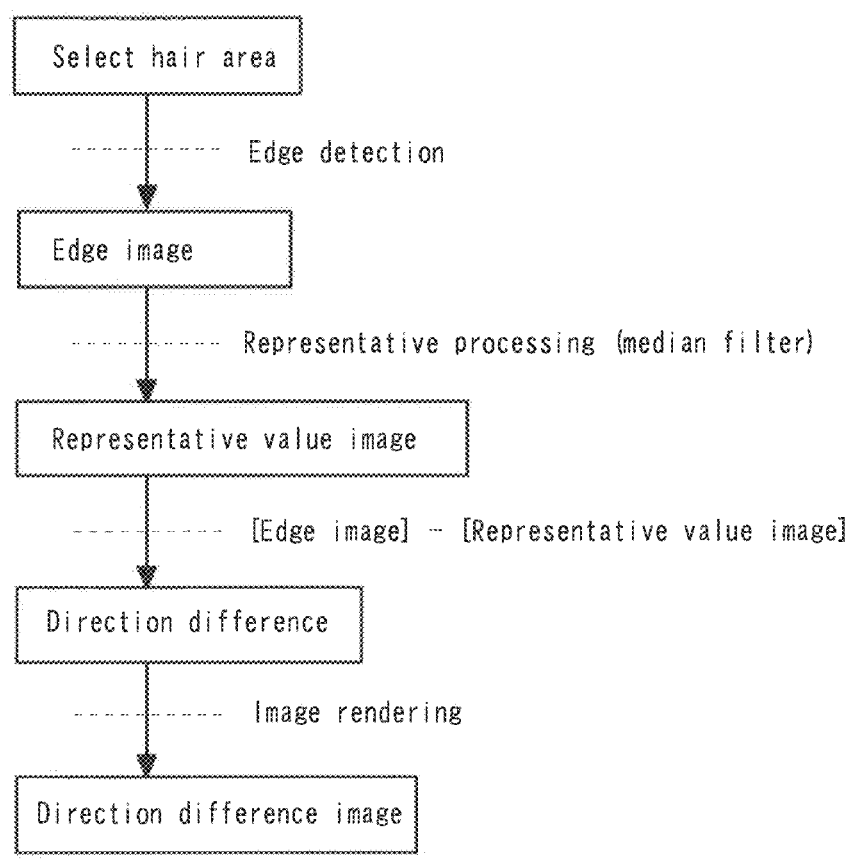
FIG. 1 is a flowchart of a first hair image display method.

EXPLANATION OF REFERENCE NUMERALS 1 hair image display apparatus
2 digital camera
3 personal computer
4 display
5 printer
6 image scanner
7 database

BEST MODE FOR CARRYING OUT THE INVENTION

Hereinafter, the present invention will be described in detail with reference to the drawings. In the drawings, like reference numerals will designate the same or equivalent components.

Figure 2:
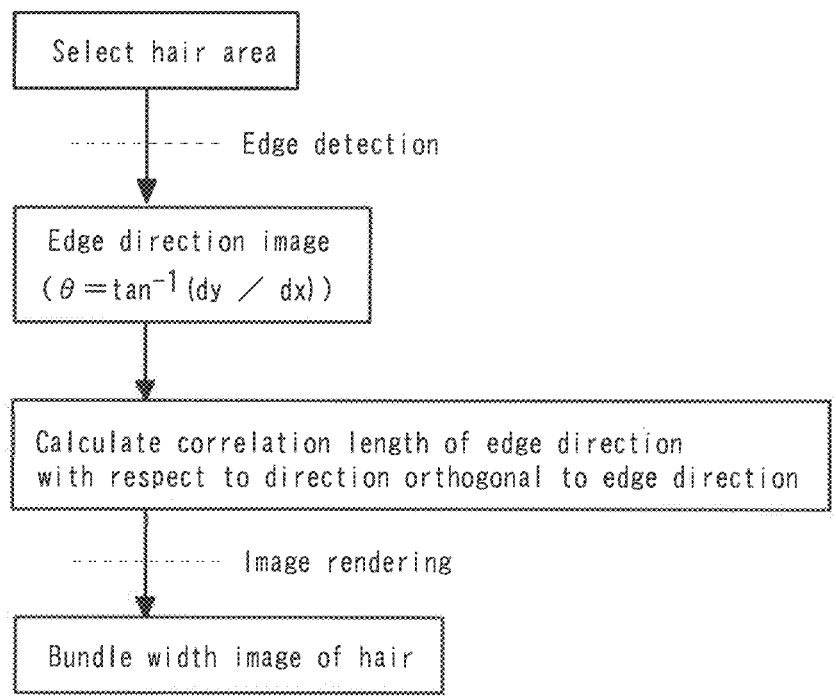
FIG. 2 is a flowchart of a second hair image display method.
Figure 3:
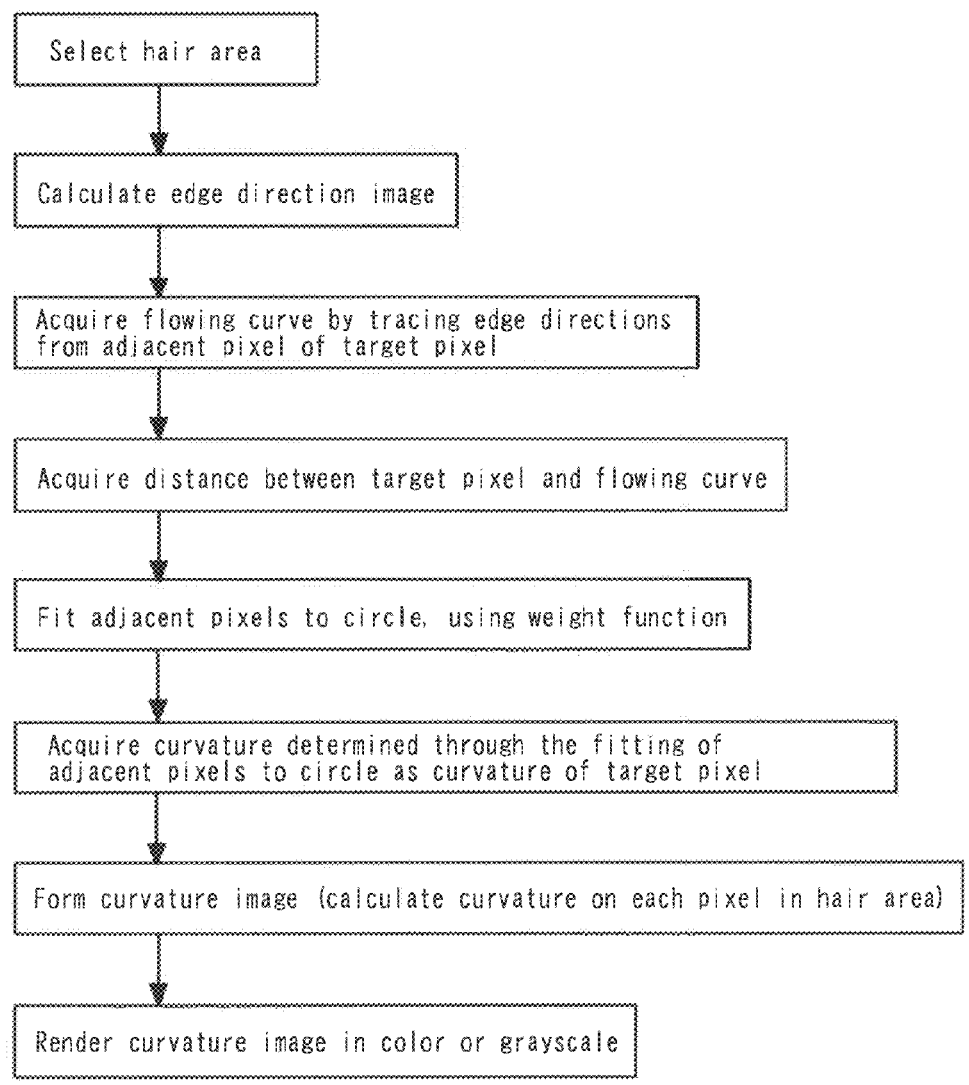
FIG. 3 is a flowchart of a third hair image display method.
Figure 4:
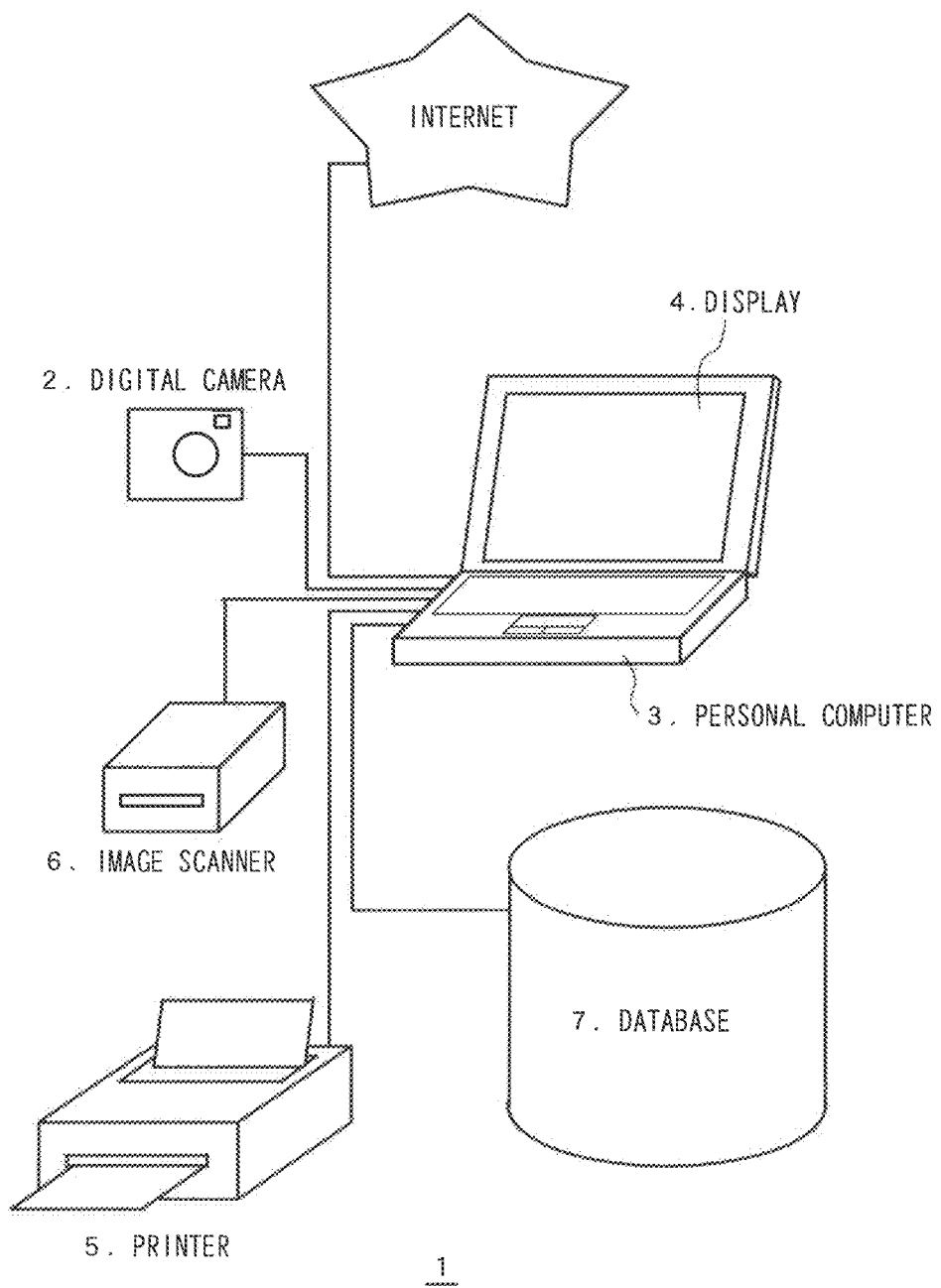
FIG. 4 is a block diagram of a hair image display apparatus.

FIGS. 1, 2, and 3 are flowcharts of Examples of the first, second, and third hair image display methods according to the present invention, respectively. FIG. 4 is a block diagram showing a hair image display apparatus 1 which implements the first, second, and third hair image display methods.

This hair image display apparatus 1 includes: a digital camera 2 which acquires a hair image of a hairstyle to be evaluated; a personal computer 3 which stores hair images taken by the digital camera 2, and applies arithmetic processing thereto; and a display 4 and a printer 5 for displaying hair images (original images) before the arithmetic processing and the results of arithmetic operations.

Aside from the digital camera 2, the means for acquiring a hair image may include an image scanner 6 which captures a hair image from a photograph of the hair style of an examinee. A drive may be included which reads a hair image from an arbitrary recording medium on which hair images are recorded. A hair image may be acquired through communication lines such as the Internet. The personal computer 3 may also be connected with a database 7 in which hair cosmetics such as styling aids and the states of styling of hair before and after application are stored.

The personal computer 3 incorporates different programs depending on which of the first, second, and third hair image display methods of the present invention to implement. When implementing the first hair image display method, the personal computer 3 incorporates a program that functions as the following means (1a) to (1e):

(1a) Means for selecting a hair area from a hair image;
(1b) Means for performing an edge detection on the selected hair area to calculate an edge image;
(1c) Means for performing representation processing on the edge image to calculate a representative value image;
(1d) Means for calculating direction differences between the edge image and the representative value image; and
(1e) Means for rendering the direction differences in color or grayscale to calculate a direction difference image.

Here, the hair image in (1a) refers to a facial image, head image, or the like that includes a hair area. To select a hair area from a hair image, for example, pixels darker than a certain threshold in brightness are picked up as the hair area if in the case of black hair. For brown hair, blond hair, or the like, pixels exceeding a certain threshold in color saturation are picked up as the hair area. The condition that a certain threshold in edge strength be exceeded may be combined with the above method to select the hair area if necessary. For the selection of the hair area, it is also preferable to take the hair image by a predetermined method in advance so that the hair area comes to a predetermined position on the hair image.

The edge image calculated by the edge detection in (1b) corresponds to an image that shows flows of hair (including hairs straying from the flows). The edge detection itself can be performed by publicly-known differential processing which uses the tone gradients of the image. More specifically, Prewitt, Robinson, Kirsch, and other edge extraction filters may be used.

For example, in a method using a Prewitt filter, a horizontal tone difference dx is calculated by:

$$\begin{pmatrix} -1 & 0 & 1 \\ -1 & 0 & 1 \\ -1 & 0 & 1 \end{pmatrix}$$ [Equation 1]

A vertical tone difference dy is calculated by:

$$\begin{pmatrix} -1 & -1 & -1 \\ 0 & 0 & 0 \\ 1 & 1 & 1 \end{pmatrix}$$ [Equation 2]

An edge direction $\theta$ corresponding to the direction of a hair flow is calculated by the following equation:

$$\theta = \tan^{-1}(dy/dx)$$ [Equation 3]

An edge strength r is calculated by the following equation:

$$r = (dx^2 + dy^2)^{1/2}$$ [Equation 4]

Figure 5A:
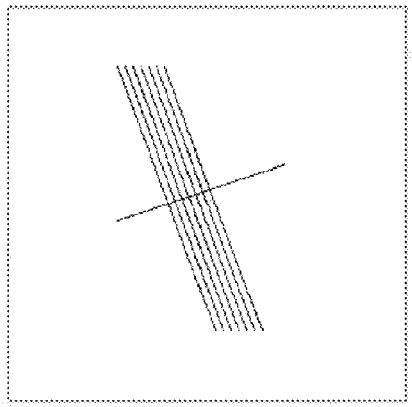
FIG. 5A is an original image.
Figure 5B:
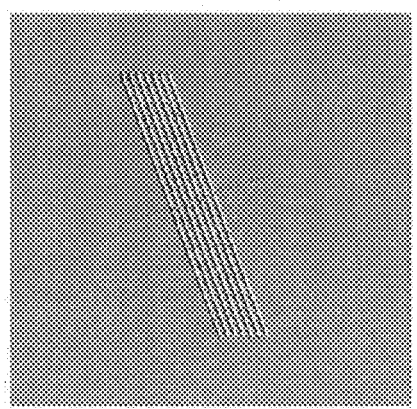
FIG. 5B is an edge image (horizontal)
Figure 5C:
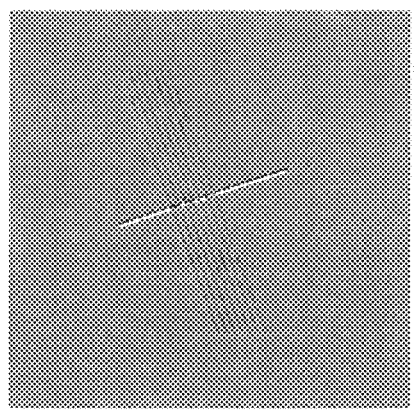
FIG. 5C is an edge image (vertical)
Figure 5D:
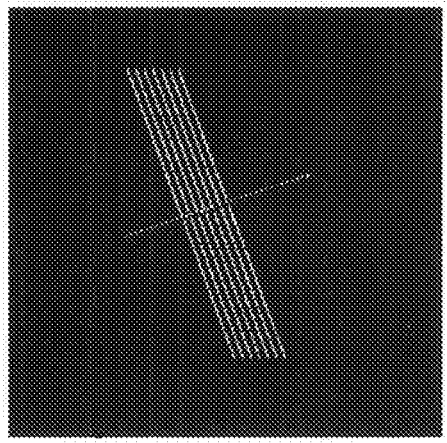
FIG. 5D is an edge direction image.
Figure 5E:
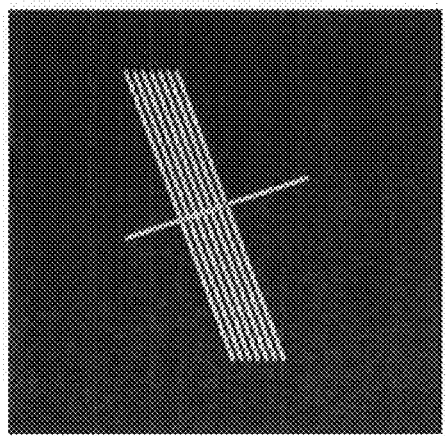
FIG. 5E is an edge strength image.

To be more specific, the edge detection is performed by using an edge extraction filter, whereby a horizontal edge image of FIG. 5B and a vertical edge image of FIG. 5C are obtained from an original image of FIG. 5A. From the horizontal edge image and the vertical edge image, edge directions are calculated based on the foregoing Equation 3 to form an edge direction image of FIG. 5D. Based on Equation 4, edge strengths are calculated to calculate an edge strength image of FIG. 5E.

The representation processing in (1c) is typically used for such purposes as eliminating noise in image processing. In the present invention, however, the representation processing is used to remove the influence of hairs straying from a flow from the edge image that shows the flows of hair.

Figure 6A:
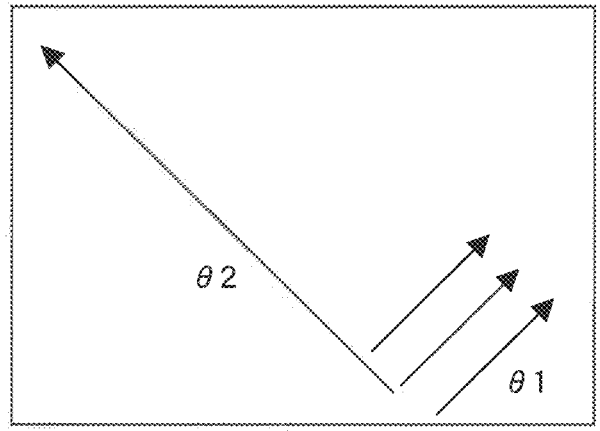
FIG. 6A is an explanatory diagram for explaining edge directions in representation processing.
Figure 6B:
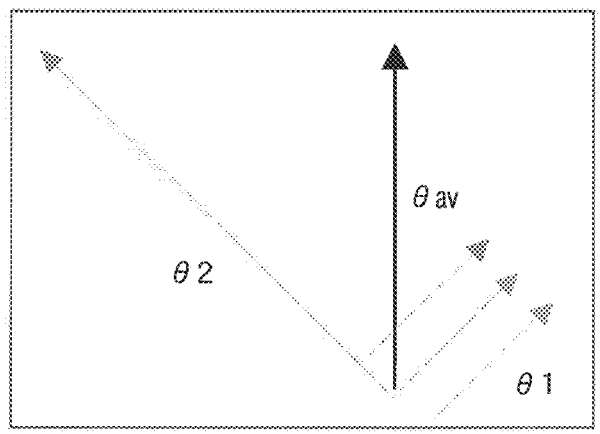
FIG. 6B is an explanatory diagram for explaining edge directions in the representation processing.
Figure 6C:
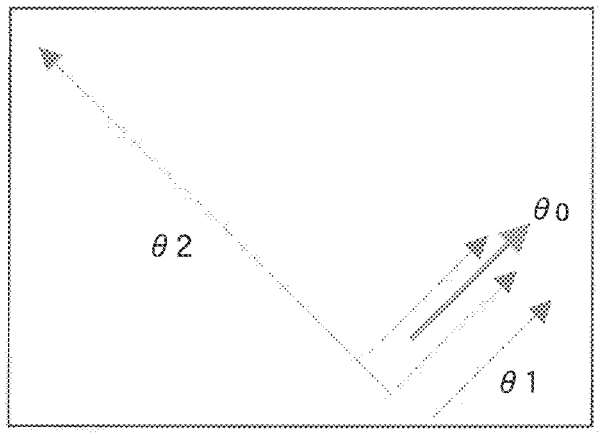
FIG. 6C is an explanatory diagram for explaining edge directions in the representation processing.

The representation processing can be performed by using a median filter, a mean filter, a trimmed mean filter, and the like. The present invention preferably uses a median filter. Specifically, the representation processing with a median filter replaces the pixel value of a pixel with a median of pixel values in a surrounding window area. The processing with a mean filter replaces the pixel value of a pixel with an average of pixel values in a surrounding window area. For example, suppose that a surrounding window area includes a large number of pixels of direction $\theta 1$ and a single pixel of direction $\theta 2$, with the pixel of the direction $\theta 2$ having an edge strength extremely higher than those of the pixels of the direction $\theta 1$ as shown in FIG. 6A. If a mean filter is used for the representation processing, the presentation processing will result in an edge direction $\theta av$ which is different from the direction $\theta 1$ of the large number of pixels as shown in FIG. 6B. The edge direction $\theta av$ resulting from the representation processing therefore does not correspond to the hair flow. In contrast, if a median filter is used, the representation will result in an edge direction $\theta o$ which corresponds to the hair flow as shown in FIG. 6C. Here, the average was calculated by determining the major axes of the edges included in the surrounding window area. The median was calculated by determining an edge that minimizes the sum of distances to the other edges included in the surrounding window area.

Upon performing the representation processing, a filter (surrounding window area) size is too small, which makes it less likely for the edge direction resulting from the representation processing to correspond to the hair flow. If too large, the directions of gentle flows of hair can contribute to the edge direction resulting from the representation processing. For example, the foregoing edge images of FIG. 5B (horizontal) and FIG. 5C (vertical) produce representative value images of FIG. 7A (horizontal) and FIG. 7B (vertical) if a median is determined in the range of adjacent two pixels in radius. Similarly, representative value images of FIG. 7C (horizontal) and FIG. 7D (vertical) result if a median is determined in the range of adjacent five pixels in radius. The preferable filter size also varies with hair styles. As compared to straight hairstyles, curly hairstyles require smaller filters, or the edge direction resulting from the representation processing is less likely to correspond to the hair flow. More specifically, for straight styles, the filter size is desirably set so that the surrounding window area has a radius three times or more the hair diameter. For curly styles, the surrounding window area desirably has a radius 0.5 times or less the radius of curvature of the curl.

The direction differences between the edge image and the representative value image of (1d) correspond to the degree of straying of hairs from a hair flow. Distances such as Mahalanobis' generalized distances and Euclidean distances may be calculated as the direction differences. Of these, Mahalanobis' generalized distances are preferably calculated.

A Mahalanobis' generalized distance is a distance measure that is calculated in consideration of a correlation between multidimensional variables and variations thereof. Specifically, a Mahalanobis' generalized distance between an edge image and a representative value image can be determined by the following equation:

$$d=((v1/\sigma1)^2+(v2/\sigma2)^2)^{1/2} \quad \text{[Equation 5]}$$

(where v1: the projective length of the intended edge with respect to the direction of the representative value,
v2: the projective length with respect to a direction orthogonal to the representative value,
σ1: the standard deviation of the projective lengths of the edges included in the surrounding window area, with respect to the direction of the representative value, and
σ2: the standard deviation of the projective lengths with respect to the direction orthogonal to the representative value).

The smaller the Mahalanobis' generalized distance is in value, the closer it indicates the subject is to the general population, i.e., the hair of interest is along the hair flow. The greater the Mahalanobis' generalized distance is in value, the farther it indicates the subject is from the population, i.e., the hair of interest strays from the hair flow.

After the calculation of Mahalanobis' generalized distances, the direction difference image may further be subjected to noise elimination processing using a median filter, a mean filter, or the like. This can put an additional emphasis on hairs that stray from a hair flow.

The processing of rendering the direction differences in color or grayscale in (1e) may be achieved, for example, by associating the numerical values of the direction differences with hue angles or associating the numerical values with tone levels. This allows visualization of the direction differences.

Figure 7A:
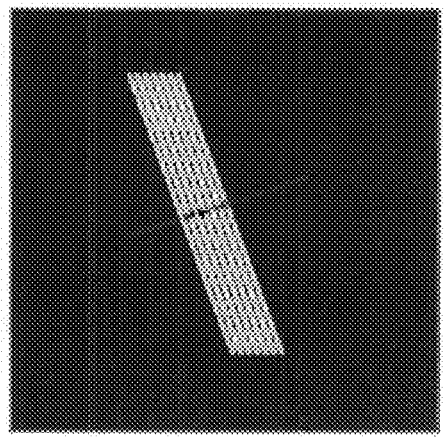
FIG. 7A is a smoothed image by size of a median filter.
Figure 7B:
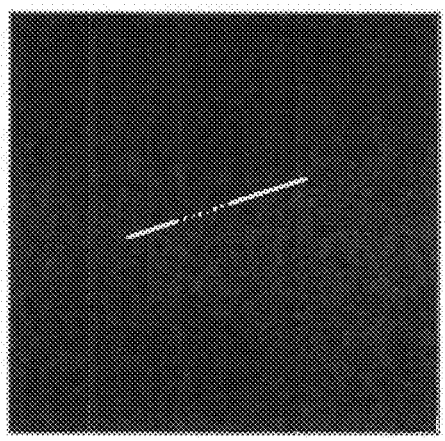
FIG. 7B is a smoothed image by size of a median filter.
Figure 7C:
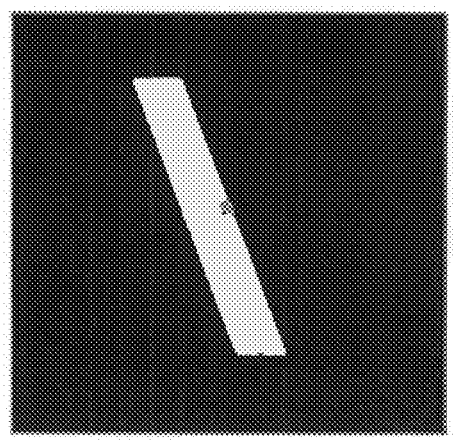
FIG. 7C is a smoothed image by size of a median filter.
Figure 7D:
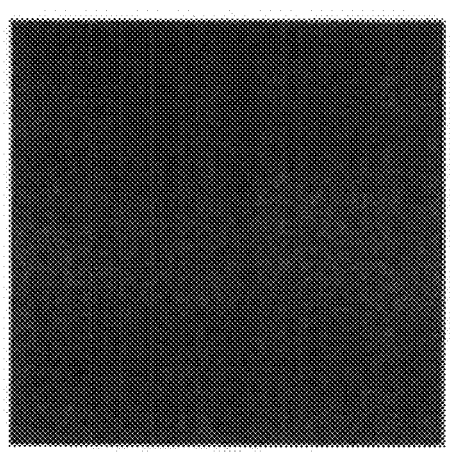
FIG. 7D is a smoothed image by size of a median filter.
Figure 8:
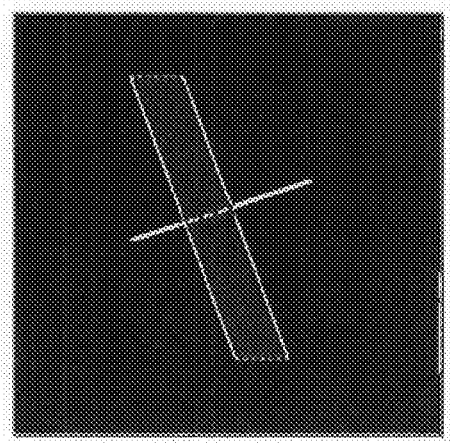
FIG. 8 is a direction difference image.
Figure 9:
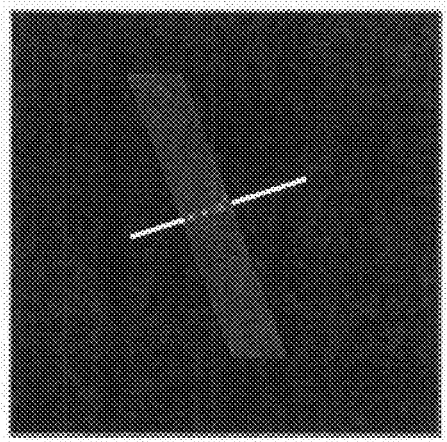
FIG. 9 is a noise-eliminated direction difference image.

For example, the Mahalanobis' generalized distances between the foregoing edge images of FIGS. 5B and 5C and the representative value images of FIGS. 7A and 7B can be rendered in 256 levels of grayscale, which yields a direction difference image of FIG. 8. Noise elimination processing using a median filter for adjacent two pixels in radius can also be performed thereon to produce a direction difference image of FIG. 9 (noise eliminated).

Figure 10:
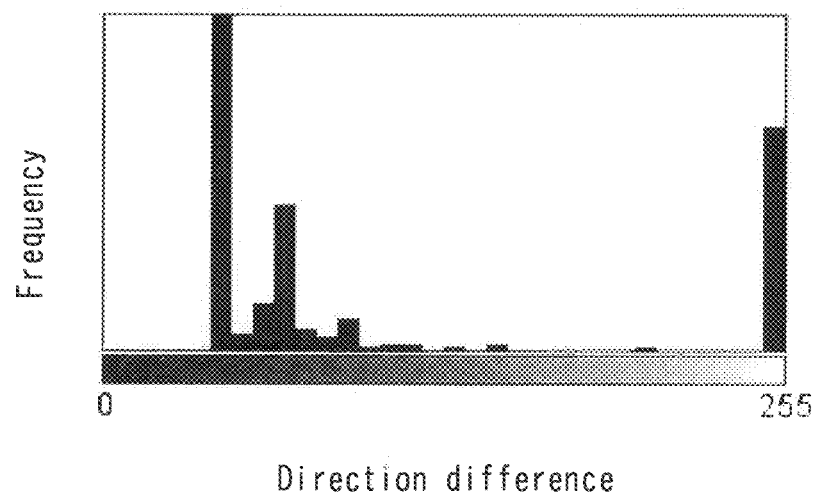
FIG. 10 is a histogram of direction differences and the frequencies of occurrence thereof.

In the present invention, the direction differences are displayed in the form of a direction difference image as mentioned above. Alternatively, the direction differences and the frequencies of occurrence thereof may be shown in a histogram or other relational diagram like FIG. 10. This facilitates statistic analysis on the degree of straying of hairs straying from hair flows, the frequencies of occurrence thereof, and so on.

The result of the analysis and the appearance of the foregoing direction difference image may be associated with the hair cosmetics and the styling methods stored in the database 7.

Now, when implementing the second hair image display method, the personal computer 3 incorporates a program that functions as the following means (2a) to (2d):
(2a) Means for selecting a hair area from a hair image;
(2b) Means for performing an edge detection on the selected hair area to calculate an edge direction image;
(2c) Means for calculating the correlation length of a pixel in the hair area as to edge direction of adjacent pixels with respect to a direction orthogonal to the edge direction of the pixel; and
(2d) Means for rendering the correlation lengths of respective pixels in color or grayscale, thereby calculating a bundle width image of hair.

Here, the meaning of the hair image and the method of selecting a hair area from the hair image in (2a) are the same as in (1a) above.

The edge detection to be performed in (2b) can also be performed in the same manner as in (1b) above.

Figure 11A:
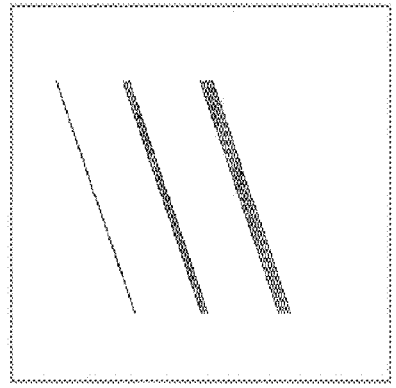
FIG. 11A is an original image.
Figure 11B:
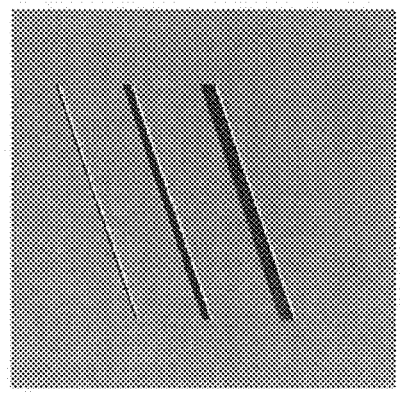
FIG. 11B is an edge image (horizontal)
Figure 11C:
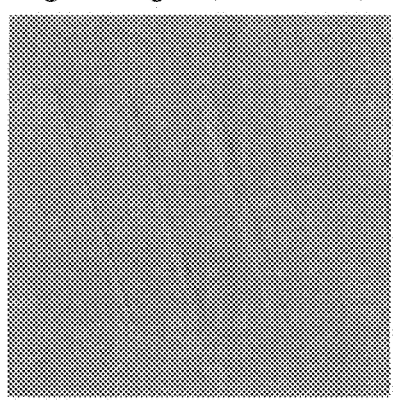
FIG. 11C is an edge image (vertical)

By the edge detection, a horizontal edge image of FIG. 11B and a vertical edge image of FIG. 11C can be obtained from an original image of FIG. 11A. From the horizontal edge image and vertical edge image, an edge direction image of FIG. 11D and an edge strength image of FIG. 11E are calculated by using the foregoing Equations 3 and 4, respectively.

Figure 12A:
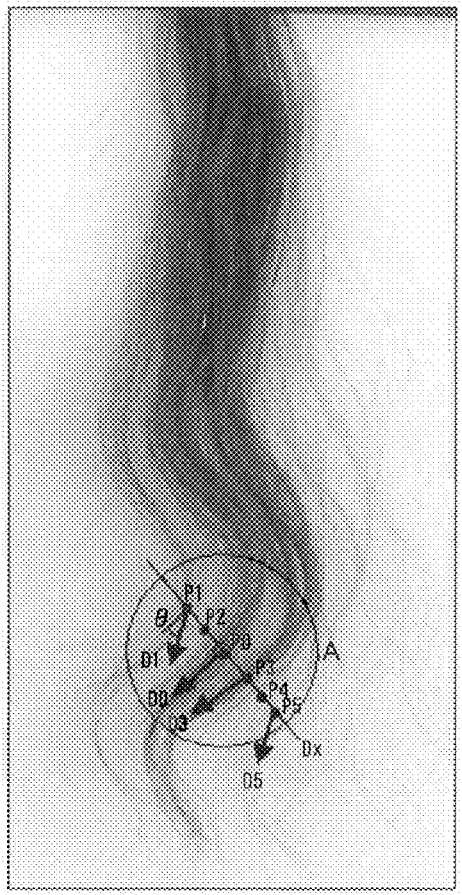
FIG. 12A is an explanatory diagram for explaining a method for calculating a correlation length.
Figure 12B:
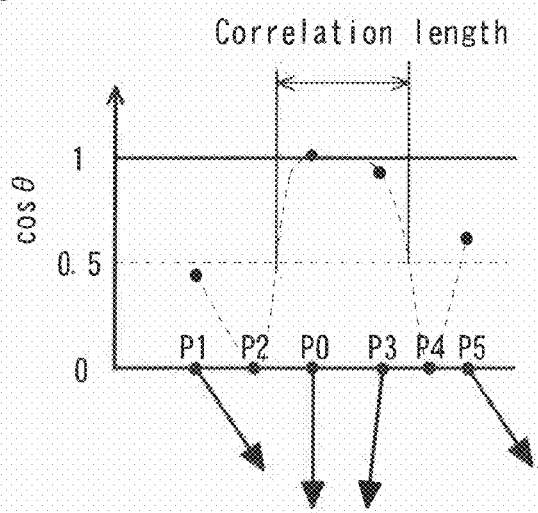
FIG. 12B is an explanatory diagram for explaining the method for calculating a correlation length.

The correlation length calculated in (2c) is an amount that indicates in how much order the edge direction of a pixel in the hair area spreads out in the direction orthogonal to the edge direction. The correlation length corresponds to the width of a hair bundle. For example, the correlation length can be determined as follows: Suppose, as shown in FIG. 12A, that the edge direction in an area A, i.e., within a circle centered around a pixel P0 is D0, the orthogonal direction is Dx, and the pixel P0 and its adjacent pixels P1, P2, P3, P4, and P5 have edge direction of D0, D1, -, D3, -, and D5, respectively. As shown in FIG. 12B, cos is determined of the angles θ formed between the edge directions of the respective pixels and the edge direction D0 of the pixel P0. The correlation length is the distance in the foregoing orthogonal direction Dx where cos θ has a value of 0.5 or higher. If there are discrete areas where cos θ has a value of 0.5 or higher, the distance of the area that includes the intended pixel P0 is employed. For the adjacent pixels, pixels that fall within a circle with a maximum bundle width predicted to be included in the image as the diameter are selected. The resulting value of the correlation length is used as the pixel value of the pixel P0.

When calculating the correlation length of the pixel P0 thus, the curve of cos θ in FIG. 12B may be replaced with that of cos" θ depending on the steepness. Moving averages of cos θ may be determined in the direction orthogonal to the edge direction, and the distance where the moving averages have a value of 0.5 or higher may be employed as the correlation value.

Alternatively, the correlation length may be calculated by determining the distance in the orthogonal direction Dx to the edge direction of the pixel P0 where the respective pixels have a color or brightness similarity higher than or equal to a certain value. Here, the color or brightness similarity is a numeric value that is calculated by, for example, 1/(1+|a color distance between the pixel P0 and an adjacent pixel/the standard deviation of the color distances of pixels included in the hair area|) or 1/(1+|a brightness difference between the pixel P0 and an adjacent pixel/the standard deviation of the brightness difference of the pixels included in the hair area|). The length of the range in the Dx direction where the color similarity reaches or exceeds a certain value or the length of the range in the Dx direction where the brightness similarity reaches or exceeds a certain value is used as the correlation length. The color distance may be a Euclidean distance in the RGB space. Distances in other color spaces such as the L*a*b* space and L*u*v* space may be used.

The correlation length is calculated for each pixel in the hair area.

The processing of rendering the correlation lengths of the respective pixels in color or grayscale in (2d) may be achieved, for example, by associating the numerical values of the correlation lengths with hues or associating the numerical values with tone levels. This can visualize the correlation lengths to provide a bundle width image in which color or tone varies with the bundle width.

Figure 11D:
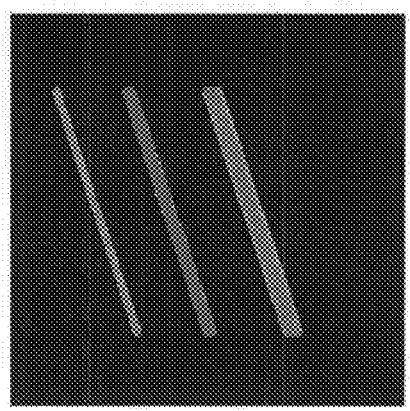
FIG. 11D is an edge direction image.
Figure 11E:
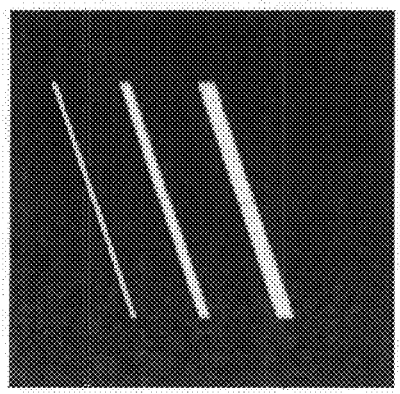
FIG. 11E is an edge strength image.
Figure 11F:
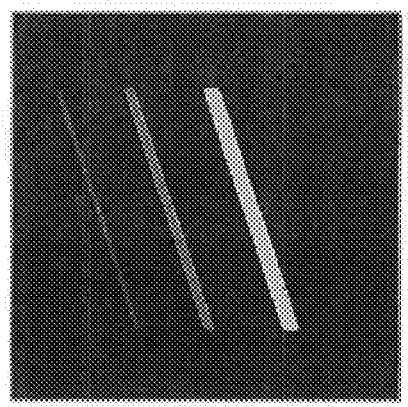
FIG. 11F is a bundle width image.

For example, the correlation lengths of the respective pixels in the foregoing edge direction image of FIG. 11D can be determined and rendered in 256 levels of grayscale to produce an image in which greater bundle widths are shown brighter, like a bundle width image of FIG. 11F.

Figure 13:
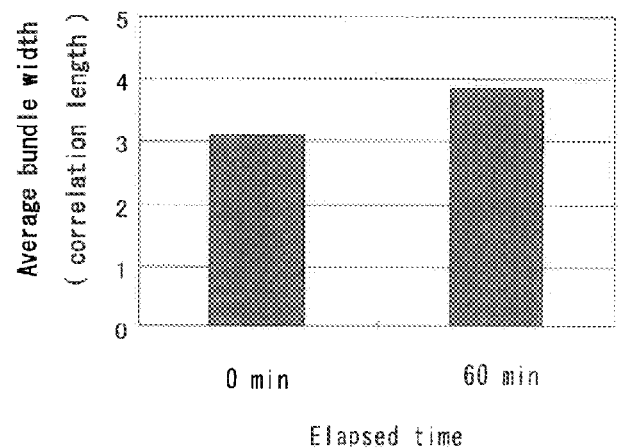
FIG. 13 is a relation chart between the correlation length and time.

Aside from displaying the correlation lengths in the form of a bundle width image as described above, the present invention may provide the plot of temporary changes in the correlation length of a certain portion of a hair bundle such as shown in FIG. 13. When a certain hair bundle is treated with hair cosmetics or when treated with additional moisture or the like, bundle width images before and after the treatment may be obtained over time to display changes in the correlation length by type of the hair cosmetics or by treatment method (temperature, time, and the like). This facilitates a statistical analysis on how styling stability varies with the type or usage of the hair cosmetics.

The results of these analyses and the appearance of the bundle width images may be associated with the hair cosmetics and the styling methods stored in the database 7.

Now, when implementing the third hair image display method, the personal computer 3 incorporates a program that functions as an arithmetic means with the following functions (3a) to (3g):

(3a) The function of selecting a hair area from a hair image;
(3b) The function of performing an edge detection on the hair area to calculate an edge direction image;
(3c) The function of tracing edge directions in succession from an adjacent pixel of a target pixel to obtain a flowing curve;
(3d) The function of fitting the adjacent pixel into a circle by using a weight function that gives the adjacent pixel a higher weight as the distance between the flowing curve and the target pixel is smaller;
(3e) The function of determining the curvature of the circle as the curvature of the target pixel;
(3f) The function of calculating such a curvature for each pixel in the hair area to form a curvature image of hair; and
(3g) The function of rendering the curvature image of hair in color or grayscale.

Here, the meaning of the hair image and the method of selecting a hair area from the hair image in (3a) are the same as in (1a) above.

The edge detection to be performed in (3b) can also be performed in the same manner as in (1b) above.

Figure 14A:
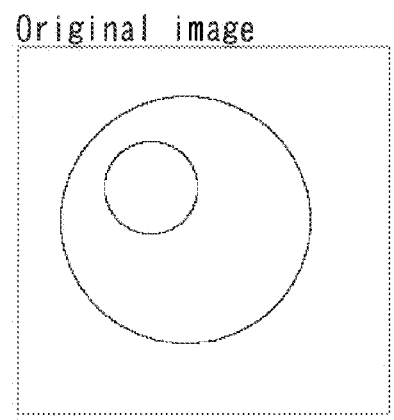
FIG. 14A is an original image.
Figure 14B:
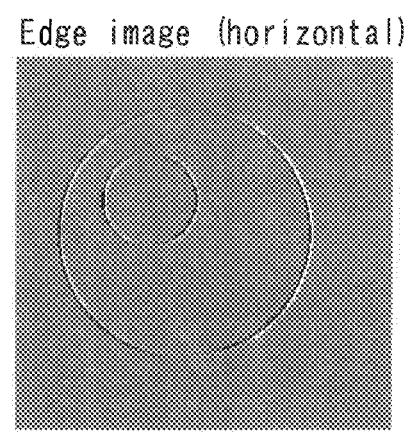
FIG. 14B is an edge image (horizontal)
Figure 14C:
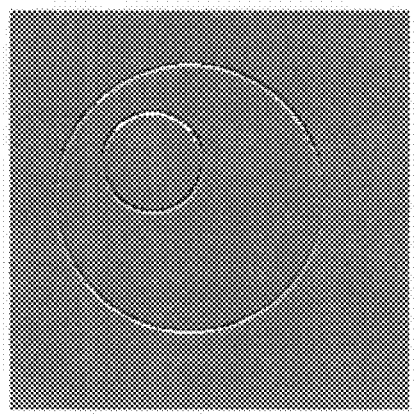
FIG. 14C is an edge image (vertical)

By the edge detection, a horizontal edge image of FIG. 14B and a vertical edge image of FIG. 14C can be obtained from an original image of double circles in FIG. 14A. From the horizontal edge image and the vertical edge image, an edge direction image of FIG. 14D and an edge strength image of FIG. 14E are calculated by using the foregoing Equations 3 and 4, respectively.

Figure 15:
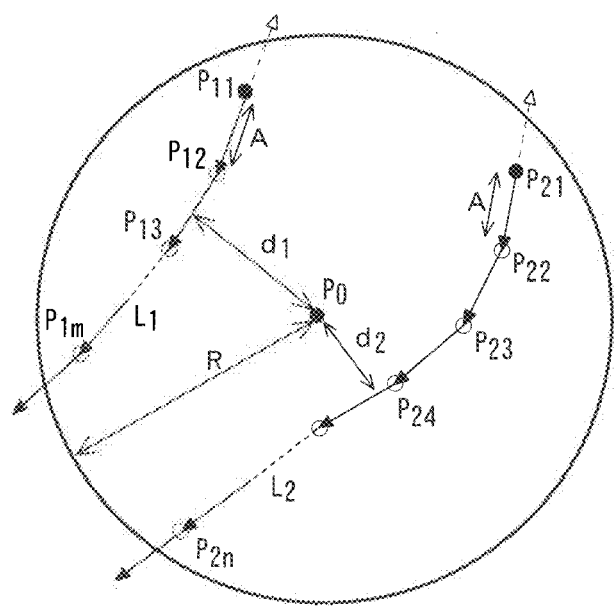
FIG. 15 is an explanatory diagram for explaining the distance between a flowing curve and a target pixel.

In (3c), tracing edge directions in succession to obtain a flowing curve includes, for example: assuming a neighborhood area with a radius of R centered around a target pixel $P_0$ as shown in FIG. 15; determining a pixel $P_{12}$ that is at a predetermined distance A from an arbitrary adjacent pixel $P_{11}$ in the area in one of the edge directions of the pixel $P_{11}$ toward the target pixel $P_0$; determining a pixel $P_{13}$ that is at a predetermined distance A from the pixel $P_{12}$ in one of the edge directions of the pixel $P_{12}$ away from the initial pixel $P_{11}$; and similarly tracing edge directions in succession in steps of predetermined distances A to determine pixels $P_{12}, \ldots, P_{1m}$, thereby obtaining a flowing curve $L_1$. As will be described later, the distance $d_1$ between the flowing curve $L_1$ and the target pixel $P_0$ is used to calculate the weight on the starting pixel $P_{11}$ of the flowing curve $L_1$.

Similarly, starting from another pixel $P_{21}$ in the neighborhood area of the target pixel $P_0$, the edge directions of the pixels are traced in succession in steps of predetermined distances A to determine pixels $P_{22}, \ldots, P_{2n}$, thereby obtaining a flowing curve $L_2$. The distance $d_2$ between the flowing curve $L_2$ and the target pixel $P_0$ is then determined. This distance $d_2$ is used to calculate the weight on the starting pixel $P_{21}$ of the flowing curve $L_2$.

This operation of determining the distance between a flowing curve and the target pixel $P_0$ is preferably performed with every adjacent pixel $(x_i, y_i)$ around the target pixel $P_0$ as the starting point of a flowing curve $L_i$.

The radius R which defines the size of the neighborhood area of the target pixel $P_0$ is preferably 0.5 times or less the radius of curvature of a curl included in the image. The steps of distance A in the edge direction are desirably twice or more the hair diameter.

In (3d), adjacent pixels are fitted into a circle basically by determining coefficients a and b and a radius r so that an error $|e_i|=|y_i-f(x_i)|$ becomes small when each pixel $(x_i, y_i)$ in the neighborhood area of the target pixel $P_0$ is fitted into a single circle equation f(x):

$$(x-a)^2+(y-b)^2=r^2 \quad \text{[Equation 6]}$$

Specific methods available include the nonlinear least squares method, the linear least squares method, and the linear least absolute deviation method. The linear least absolute deviation method is preferably used because of its relatively simple calculation and favorable fitting precision. It is also preferable to use a weight function that gives the adjacent pixels a higher weight as the distance $d_i$ between the flowing curve $L_i$ and the target pixel $P_0$ is smaller.

For example, using a weight function $w_i$:

$$w_i=1-(d_i/R)^n \quad \text{[Equation 7]}$$

(where $d_i$ is the distance between the flowing curve $L_i$ and the target pixel $P_0$ with the pixel $(x_i, y_i)$ as the starting point of the flowing curve $L_i$, R is the radius for defining the neighborhood of the target pixel $P_0$, and n is a coefficient ranging from 0.2 to 30 depending on the steepness of the weight function), the fitting to a circle is effected so as to minimize $$\Sigma|w_i e_i| \quad \text{[Equation 8]}$$

With this weight function $w_i$, a higher weight is given to an adjacent pixel that forms a flowing curve $L_i$ that passes near the target pixel $P_0$ with a smaller $d_i$. A lower weight is given to an adjacent pixel that forms a flowing curve $L_i$ that lies away from the target pixel $P_0$ with a larger $d_i$. This makes it possible to fit the adjacent pixels of the target pixel $P_0$ to a circle without thinning of the hair image. The fitting of the adjacent pixels of the target pixel $P_0$ to a circle can thus be performed even with a typical hair styling image where hairs are thick.

In the present invention, the curvature of the circle obtained thus is employed as the curvature of the target pixel $P_0$.

In (3f), a curvature image of hair is formed by repeating the foregoing calculation of the curvature of the target pixel $P_0$ with each pixel in the hair area as the target pixel, thereby determining the curvature of each pixel.

The curvature image of hair can be rendered in color or grayscale for display. The processing of rendering the curvature image of hair in color or grayscale can be achieved, for example, by associating the curvatures of the respective pixels with color hues or tone levels corresponding to the curvatures. This allows visualization of the curvature image for display.

Figure 14D:
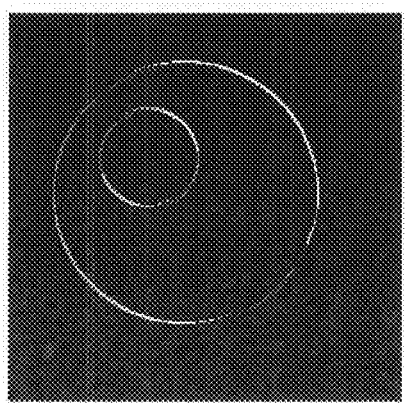
FIG. 14D is an edge direction image.
Figure 14E:
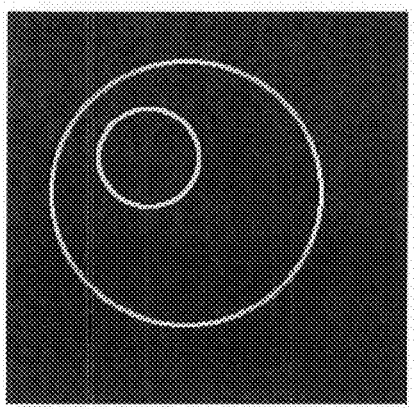
FIG. 14E is an edge strength image.
Figure 14F:
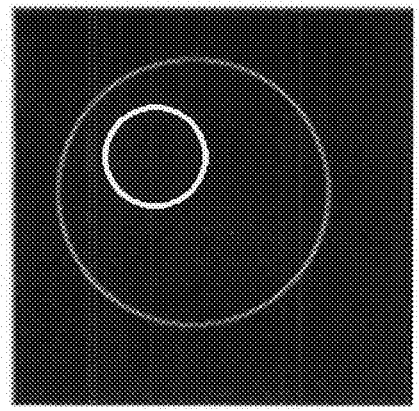
FIG. 14F is a curvature image.

For example, a curvature image calculated from the edge direction image of FIG. 14D can be rendered in 256 levels of grayscale to obtain a curvature image of FIG. 14F. This curvature image shows a circle of greater curvature (smaller radius) brighter, which facilitates visually observing the distribution of curvatures on the subject.

Aside from the foregoing visualization and display, curvature images may be utilized to plot temporary changes in the distribution of curvatures on a certain portion of hair bundle. When a certain hair bundle is treated with hair cosmetics or when treated with additional moisture, curvature images before and after the treatment may be obtained over time to display the curvature images in a contrastive fashion by type of the hair cosmetics or by treatment method (temperature, time, and the like). This facilitates a statistical analysis on how the stability of styling such as curls and straightness varies with the type or usage of the hair cosmetics.

The results of these analyses and the appearance of the curvature images may be associated with the hair cosmetics and the styling methods stored in the database 7.

EXAMPLES

Example 1

Figure 16A:
FIG. 16A is an original image in Example 1.
Figure 16B:
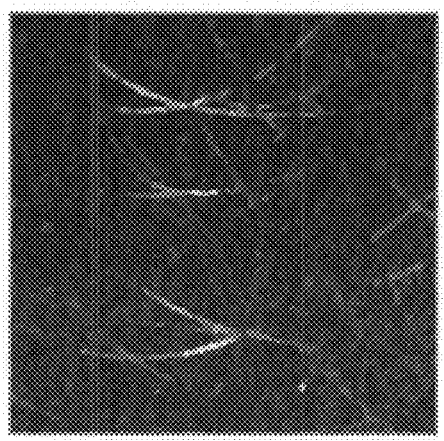
FIG. 16B is a direction difference image in Example 1.

A hair image (original image) of black hair was taken with a digital camera (diffused lighting, approximately 4.0M-pixel image sensor). A hair area P (256×256 pixels) at the center, shown in FIG. 16A was subjected to an edge detection with a Prewitt filter. From the resulting edge images, representative value images were calculated by using a median filter (filter size: 20 pixels in radius, which corresponds to approximately seven times the hair diameter). Mahalanobis' generalized distances between the edge images and the representative value images were calculated and rendered in grayscale to obtain a direction difference image. Using a median filter (filter size: 1 pixel in radius), noise elimination was performed to obtain a direction difference image of FIG. 16B. This direction difference image successfully showed hairs stretching in horizontal directions as emphasized against hairs generally flowing from top down.

Example 2

Figure 17A:
FIG. 17A is an original image in Example 2.
Figure 17B:
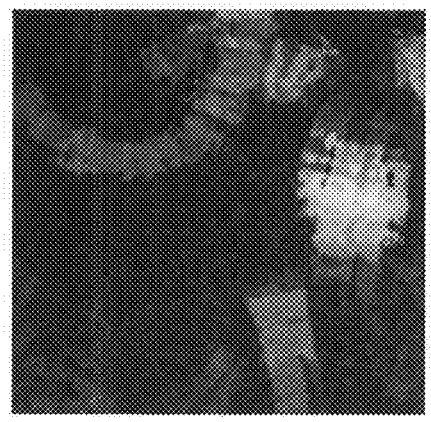
FIG. 17B is a bundle width image in Example 2.
Figure 18A:
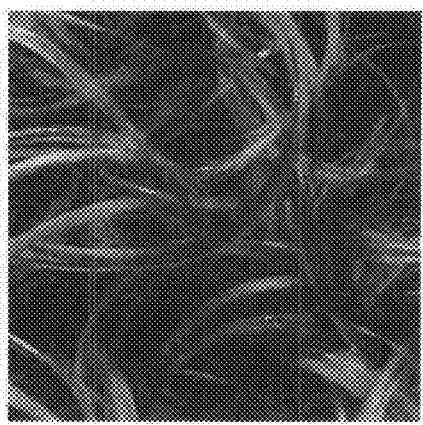
FIG. 18A is an original image in Example 2.
Figure 18B:
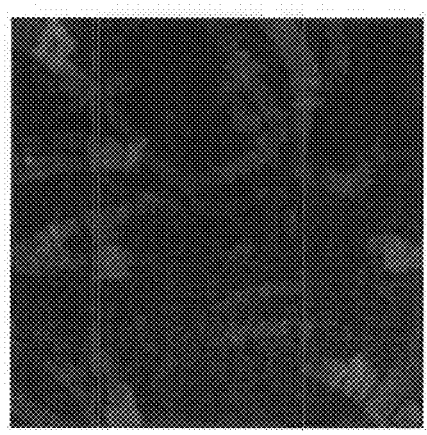
FIG. 18B is a bundle width image in Example 2.

A hair image (original image) of brown hair was taken with a digital camera (diffused lighting, approximately 4.0M-pixel image sensor). Hair areas P (256×256 pixels) at the center, shown in FIGS. 17A and 18A were subjected to an edge detection with a Prewitt filter. From the resulting edge direction images, distances in edge-orthogonal directions where cos θ reached or exceeded 0.5 were calculated. The calculations were rendered in grayscale to obtain bundle width images of hair of FIGS. 17B and 18B. These bundle width images clearly show differences in image tone depending on the widths of the hair bundles. According to the method of the present example, it is thus possible to emphasize changes in the bundle width when displaying hairstyles that vary depending on hair styling aids etc.

Example 3

Figure 19A:
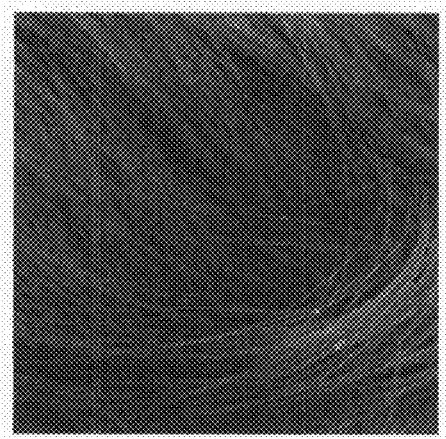
FIG. 19A is an original image in Example 3.
Figure 19B:
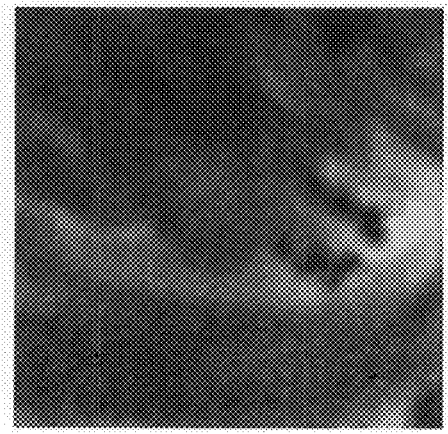
FIG. 19B is a curvature image in Example 3.

A hair image (original image) of black hair was taken with a digital camera (diffused lighting, approximately 4.0M-pixel image sensor). A hair area P (256×256 pixels) at the center, shown in FIG. 19A was subjected to an edge detection with a Prewitt filter. From the resulting edge images, the curvature of a target pixel was determined by the following method, with a radius of 30 pixels as the processing area for determining the curvature of the target pixel. The entire hair area was scanned by this processing to obtain a curvature image, which was rendered in grayscale to obtain a curvature image of FIG. 19B.

For determining the curvature of a target pixel, a radius R=30 pixels (corresponding to approximately 10 times the hair diameter) was set as the neighborhood of the target pixel. Assuming a flowing curve from each adjacent pixel in steps of 15 pixels (approximately 5 times the hair diameter) in the edge directions, the distance d between the flowing curve and the target pixel was determined. With a weight function of $1-(d/R)$, each pixel lying in the neighborhood of the target pixel was fitted to a circle by the linear least absolute deviation method. The curvature of the resulting circle was employed as the curvature of the target pixel.

Example 4

Figure 20A:
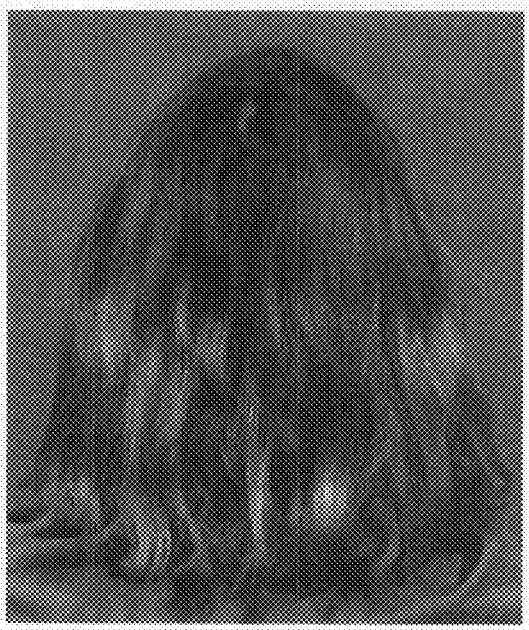
FIG. 20A is an original image in Example 4.
Figure 20B:
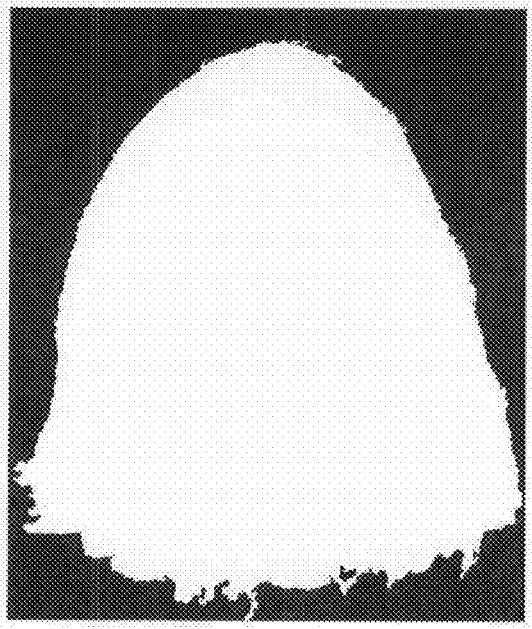
FIG. 20B is an image showing a hair area in Example 4.
Figure 20C:
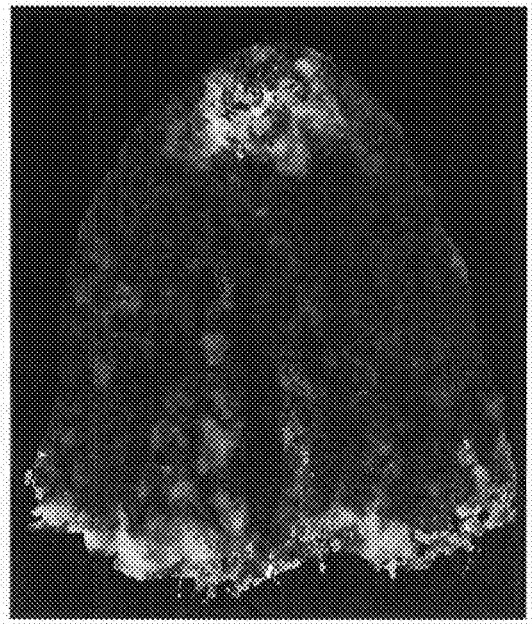
FIG. 20C is a curvature image in Example 4.

A head of hair was taken with a digital camera (diffused lighting, approximately 1.5M-pixel image sensor) A scalp hair image (640×768 pixels) shown in FIG. 20A was extracted, and a hair area shown in FIG. 20B was defined based on color saturation. The hair area of the scalp hair image was subjected to an edge detection with a Prewitt filter. From the resulting edge images, the curvature of a target pixel was determined by generally the same method as in Example 3, with a radius of 30 pixels as the processing area for determining the curvature of the target pixel. The curvature of each pixel included in the hair area was determined in succession to obtain a curvature image, which was rendered in grayscale to obtain a curvature image of FIG. 20C.

Figure 20D:
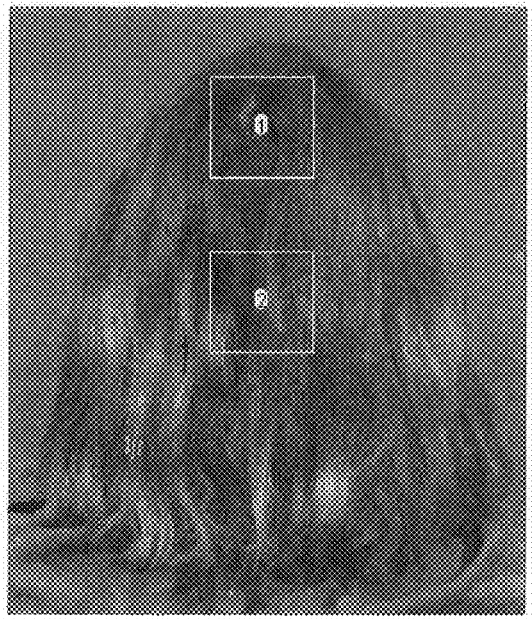
FIG. 20D is the original image of Example 4, with indications near a whorl of hair and near the center.
Figure 20E:
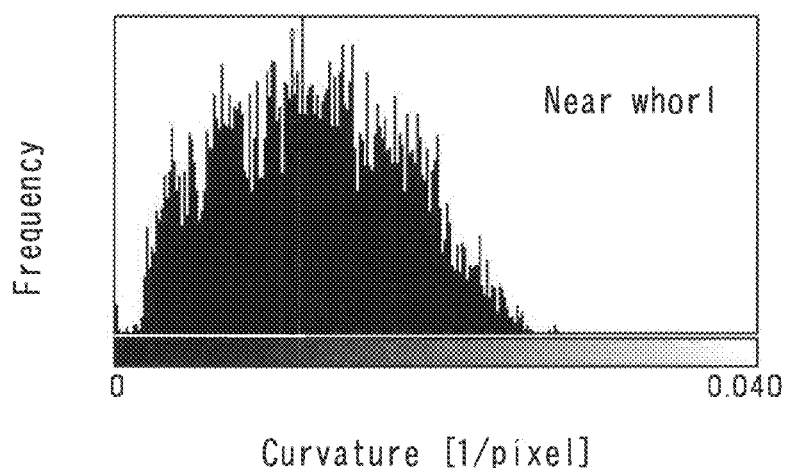
FIG. 20E is a histogram of curvatures near the whorl of hair in Example 4.
Figure 20F:
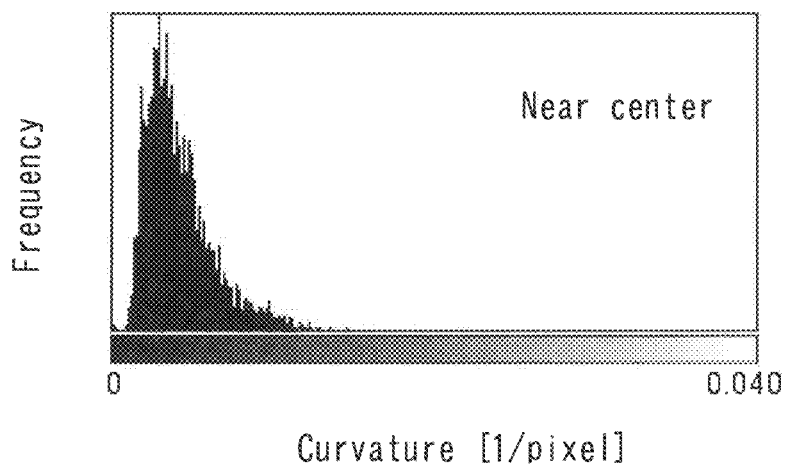
FIG. 20F is a histogram of curvatures near the center in Example 4.

For determining the curvature of a target pixel, a radius R=30 pixels (equivalent to approximately 250 times the hair diameter) was set as the neighborhood of the target pixel. Assuming a flowing curve from each adjacent pixel in steps of 6 pixels (approximately 50 times the hair diameter) in the edge directions, the distance d between the flowing curve and the target pixel was determined. With a weight function of $1-(d/R)$, each pixel lying in the neighborhood of the target pixel was fitted to a circle by the linear least absolute deviation method. The curvature of the resulting circle was employed as the curvature of the target pixel. FIGS. 20E and 20F show histograms of the curvatures at areas (128×128 pixels) near a whorl of hair (1) and near the center (2) shown in FIG. 20D, respectively. It can be seen that the curvatures near the whorl (1) are approximately three times those near the center (2).

INDUSTRIAL APPLICABILITY

The first hair image display method and display apparatus according to the present invention are useful in evaluating the degree of straying, distribution, and the like of hairs straying from a flow in hair styling. The second hair image display method and display apparatus according to the present invention are useful in evaluating the spreading of hair bundles in hair styling. The third hair image forming method and display apparatus according to the present invention are useful in evaluating the curls of hair bundles in hair styling. Each of the methods and apparatuses is also useful in evaluating hair cosmetics themselves and styling methods themselves that are used for styling. The methods and apparatuses are also useful for developing, advertising, and selling hair cosmetics and styling methods.

The invention claimed is:

1. A hair image display method comprising:
   selecting a hair area from a hair image, the hair area including an image of strands of hair;
   performing an edge detection on the hair area to calculate an edge image, the edge image representing a flow of the strands of hair;
   performing representation processing on the edge image to calculate a representative value image, the representative value image suppressing an influence of the strands of hair that stray from the flow, with respect to the edge image;
   calculating direction differences between the edge image and the representative value image; and
   rendering the direction differences of respective pixels in color or grayscale to display a direction difference image that illustrates a degree of straying of the strands of hair that stray from the flow with respect to the flow.

2. The hair image display method according to claim 1, wherein the representation processing is performed with a median filter.

3. The hair image display method according to claim 1, wherein Mahalanobis' generalized distances are calculated as the direction differences.

4. A hair image display apparatus comprising:
   hair image acquisition means;
   means for selecting a hair area from a hair image, the hair area including an image of strands of hair;
   means for performing an edge detection on the hair area to calculate an edge image, the edge image representing a flow of the strands of hair;
   means for performing representation processing on the edge image to calculate a representative value image, the representative value image suppressing an influence of the strands of hair that stray from the flow, with respect to the edge image;
   means for calculating direction differences between the edge image and the representative value image;
   means for rendering the direction differences of respective pixels in color or grayscale to calculate a direction difference image that illustrates a degree of straying of the strands of hair that stray from the flow with respect to the flow; and
   display means for displaying the direction difference image.

5. The hair image display apparatus according to claim 4, wherein the representation processing is performed with a median filter.

6. The hair image display apparatus according to claim 4, wherein Mahalanobis' generalized distances are calculated as the direction differences.

* * * * *